May 17, 1932. G. M. BELLANCA 1,858,761
AIRPLANE ENGINE ARRANGEMENT
Filed June 7, 1930
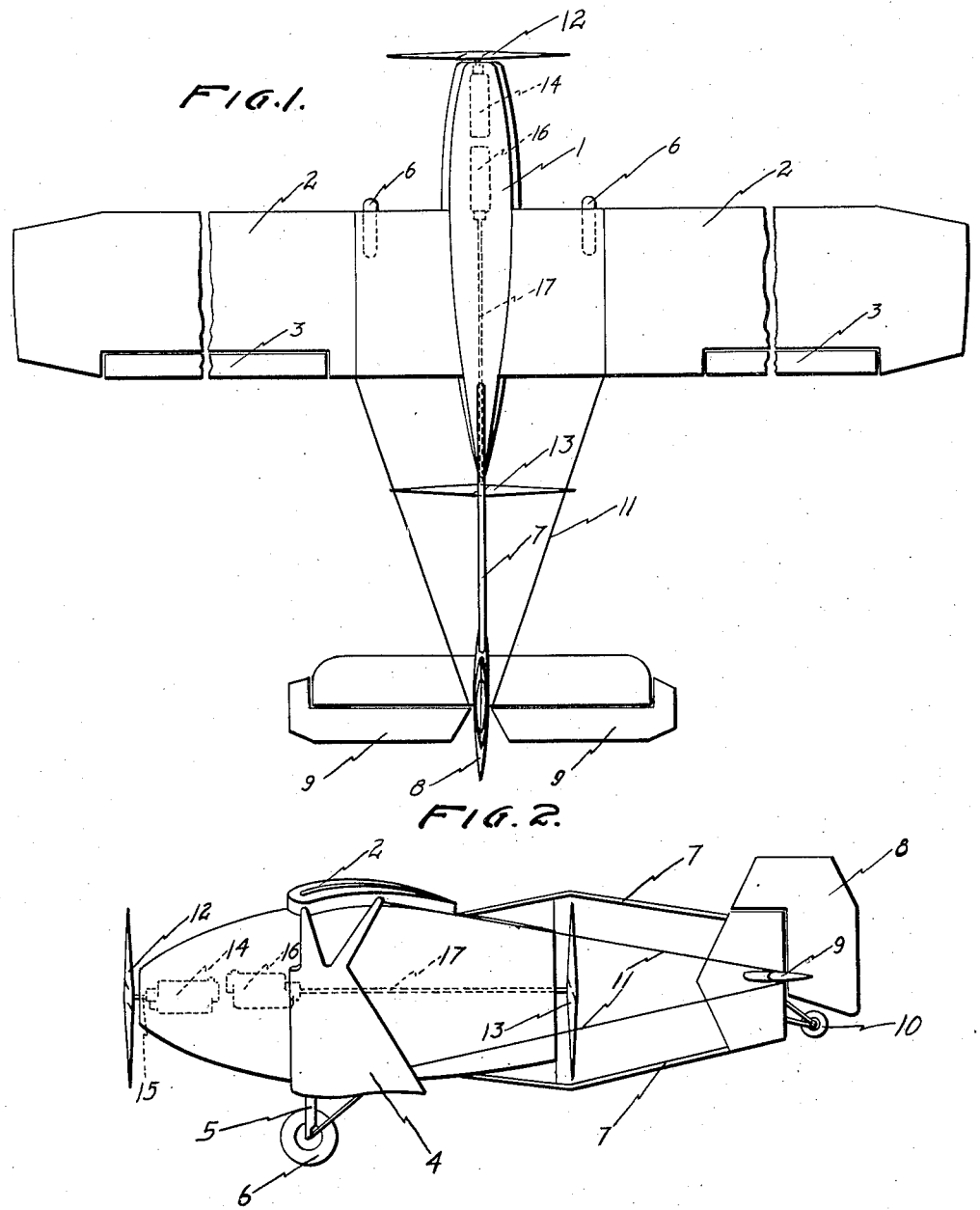

Patented May 17, 1932

1,858,761

UNITED STATES PATENT OFFICE

GIUSEPPE M. BELLANCA, OF NEW CASTLE, DELAWARE

AIRPLANE ENGINE ARRANGEMENT

Application filed June 7, 1930. Serial No. 459,741.

This invention relates in general to airplanes and more particularly has reference to an improved arrangement for airplane motors.

Heretofore it has been customary to provide airplanes with one or more engines, each being connected with a propeller for driving the airplane. Because of the likelihood of any single engine becoming disabled during flight, an airplane in which the power is furnished by a plurality of independent units is obviously highly desirable.

Up to this time, multi-motored airplanes have been constructed with their respective power plants arranged in a number of different ways. Probably the most common of these has been the tri-motored type of plane carrying one motor on the nose of the fuselage and a motor on each wing at equal distances from the fuselage. Another type has been the bi-motored plane having one motor positioned on each wing at equal distances from the fuselage. Yet another type has been the multi-motored plane. In this type the motors are grouped in pairs on the wings, there being an even number of pairs so that the plane will be balanced. The respective pairs are arranged in tandem, so that in each pair, one motor operates a pushing propeller and the other a pulling propeller.

Although the arrangements of engines above discussed have secured some of the advantages of multiplying the number of independent units in airplanes, each of these also has certain pronounced drawbacks. Prominent among these is the inherent feature in each arrangement, except in the tri-motored arrangement, whereby the resultant driving effect of all the motors is thrown off center upon the failure of any single unit. This is also true of the tri-motored type of arrangement except in the case where the motor which fails is the central motor.

It is also noted that when the engines are mounted on the wings there arises the necessity for relatively heavy framing to support them, thus substantially increasing the weight of the plane. Furthermore, this framing as well as the motors themselves, substantially increases the total air resistance of the airplane.

It is apparent that any arrangement of a plurality of motors in an airplane in such a manner as to avoid the above-mentioned difficulties would be highly desirable.

To overcome the above and other disadvantages in the prior arrangements of airplane motors is one of the objects of this invention.

Another object of this invention is to provide an arrangement of motors in an airplane whereby the failure of one motor will not unbalance the resultant driving force exerted on the plane.

Yet another object of this invention is to provide an arrangement of the motors in an airplane whereby the application of force due to the action of the propeller connected with each individual motor is substantially in the same straight line longitudinally of the airplane.

Another object of this invention is to provide an arrangement of motors in an airplane whereby the application of force to an airplane by the propeller connected to each individual motor is substantially along a line passing through the center of gravity of the airplane.

Yet another object of this invention is the provision of an arrangement of motors in an airplane in which the motors are not exposed to and do not interfere with the air stream.

Another object of the present invention is to provide an arrangement of motors in an airplane in which it is not necessary to have heavy frame members for motor supports.

With the above and other objects in view this invention comprehends an arrangement of engines in an airplane in such a manner that under no circumstances can the point of application of the resultant force to the airplane be changed.

To assist in an adequate understanding of this invention, and wishing it to be distinctly understood that various changes and modifications may be made in the preferred embodiment herein shown by way of example without departing from the spirit or scope of my invention, reference is made to the accompanying drawings in which similar numerals indicate corresponding parts.

Figure 1 is a diagrammatic plan view of an airplane of the monoplane type disclosing the novel arrangement of motors within the fuselage.

Figure 2 is a diagrammatic side view of the structure shown in Figure 1.

Referring now more particularly to the drawings there is shown in outline an airplane of the monoplane type having a fuselage 1 and a wing 2. This wing is provided at its trailing edge with the usual ailerons 3 and is further provided with brace members 4 extending from its lower surface to the lower portion of the fuselage. These brace members 4 are preferably of the type which themselves are formed to furnish a sustaining surface to assist in supporting the airplane. Attached to the lower portion of the airplane in any conventional manner but preferably by being attached to the braces 4 adjacent the fuselage are the wheel supporting structures 5 carrying the landing wheels 6.

To the rearmost portion of the fuselage 1 the rearwardly extending support members 7 for supporting the empennage are attached. This empennage consists of the usual rudder 8 and elevators 9, and carries by a suitable mounting attached to its lower portion, a rear landing wheel 10. This tail structure is further braced against lateral movements by means of the tension members 11. As is well known, this outrigger type of empennage has numerous advantages, among which are lightness and ease of control. It is also apparent that this construction enables a standardization in fuselage size and construction. As will hereinafter more fully appear, this type of construction is also well adapted to my improved arrangement of motors and propellers.

At its forward and rearward ends, the fuselage is provided with tractor and pusher propellers 12 and 13 respectively for driving the airplane. Within the fuselage there is arranged the engine 14 adjacent the nose of the fuselage for the purpose of driving the tractor propeller 12 through the intermediary of the propeller shaft 15. Directly to the rear of and substantially in line with the engine 14 there is arranged a second engine 16 for the purpose of driving the pusher propeller 13 through the intermediary of the shaft 17. The shafts 15 and 17 are arranged to extend along the same line so that each of the propellers attached to the respective shafts will act on the airplane to drive it in exactly the same direction. These engines may be of any well-known type, such as gasoline or Diesel and may be water-cooled.

It will be seen that there has been provided an arrangement of a plurality of motors in an airplane whereby in the event of the failure of one of the motors the other would continue to propel the plane in the same direction, and the line of application of its propelling force would be the same as the resultant line of application of the propelling forces of the two motors taken together had been.

It will further be seen that the mounting of the motors within the fuselage has made it possible to mount them more directly upon the strong frame of which the fuselage is constructed and to eliminate the necessity for heavy framework for supporting them outside of the fuselage.

It is also apparent that by placing the motors within the fuselage the air resistance caused by the motors and by any framework provided for their support has been substantially eliminated.

Also placing the motors within the fuselage has allowed the positioning of the propellers of the airplane so that the line of thrust due to the action of each propeller passes substantially through the center of gravity of the airplane as a whole.

It will be appreciated that while the invention has been shown as applied to an airplane of the monoplane type, it might as well be incorporated in an airplane of any other type commonly in use.

It will be appreciated as aforementioned that various modifications and alterations may be made in the arrangement herein described without exceeding the scope of the invention as defined by the appended claim, it being distinctly understood that the prior art and the claim herein included alone are to be definitive of the invention.

I claim:

In an airplane having a fuselage terminating adjacent the trailing edge of the wing, support members extending from said fuselage upwardly for a relatively short distance and downwardly to the termination thereof, an empennage carried by said support members at the termination, a plurality of motors mounted closely adjacent each other in tandem in the forward part of the fuselage adapted to drive tractor and pusher propellers, respectively, the pusher propeller being located in the larger space between the support members so that the slip stream therefrom is substantially unobstructed for impingement on the empennage.

In testimony whereof I affix my signature.

GIUSEPPE M. BELLANCA.